United States Patent
Anderson, III et al.

[19]

[11] Patent Number: 5,823,745
[45] Date of Patent: Oct. 20, 1998

[54] METHOD OF REPAIRING A STEAM TURBINE ROTOR

[75] Inventors: Karl Rudolph Anderson, III, Naperville, Ill.; Gerald Richard Crawmer, Clifton Park, N.Y.; Edward Kenneth Ellis, Bangor, Me.; John Francis Nolan, Latham, N.Y.; Louis Patrick Earvolino, Holliston, Mass.; Robert Ellis Seeley, Broadalbin, N.Y.; Joseph John Pepe, Ballston Lake, N.Y.; Robert Joseph Christoffel, Schenectady, N.Y.; Joseph Louis Van Ullen, Loudonville, N.Y.

[73] Assignee: General Electric Co., Schenectady, N.Y.

[21] Appl. No.: 691,276

[22] Filed: Aug. 1, 1996

[51] Int. Cl.⁶ .................................................. F04D 29/34
[52] U.S. Cl. ................................. 416/213 R; 416/204 A; 416/241 R
[58] Field of Search ........................... 416/204 R, 204 A, 416/210 R, 210 A, 213 R, 213 A, 241 R

[56] References Cited

U.S. PATENT DOCUMENTS

| | | | |
|---|---|---|---|
| 2,450,493 | 10/1948 | Strub | 416/204 R |
| 2,759,249 | 8/1956 | Eberle | 416/204 R |
| 3,588,276 | 6/1971 | Junb | 416/213 R |
| 4,573,876 | 3/1986 | Egan et al. | 416/213 R |
| 4,676,843 | 6/1987 | Nazmy | 416/213 R |
| 4,710,103 | 12/1987 | Faber et al. | 416/219 R |
| 4,784,572 | 11/1988 | Novotny et al. | 416/213 R |
| 4,897,519 | 1/1990 | Clark et al. | 219/76.14 |
| 4,958,431 | 9/1990 | Clark et al. | 29/889.1 |
| 5,197,857 | 3/1993 | Glynn et al. | 416/204 A |
| 5,746,579 | 5/1998 | Amos et al. | 416/204 A |

Primary Examiner—John Kwon
Attorney, Agent, or Firm—Domenica N. S. Hartman; Robert C. Lampe, Jr.

[57] ABSTRACT

A turbine rotor comprising a radially-inward portion of a steel alloy and a radially-outward rim portion circumscribing the radially-inward portion, the rim portion being formed by a weldment that includes a nickel-base superalloy region joining the rim portion to the inward portion of the turbine rotor, the nickel-base superalloy having a room temperature ultimate tensile strength of at least about 690 MPa.

11 Claims, 1 Drawing Sheet

METHOD OF REPAIRING A STEAM TURBINE ROTOR

The present invention relates to steam turbine rotors. More particularly, this invention relates to a method for repairing a steam turbine rotor to which blades (buckets) are attached, wherein the method entails a welding and machining process that reconstructs the rim with a material that differs from the base material of the rotor.

BACKGROUND OF THE INVENTION

Steam turbines generally include a number of rotors coupled together, with each rotor including a shaft having an integrally-formed wheel that is equipped with multiple blades (buckets) attached to the perimeter or rim of the wheel. A conventional technique for securing the blades to the rotor is to form the rim to have a dovetail cross-section, with each blade having a root portion formed with a complementary dovetail feature that interlocks with the dovetail region of the rim to secure the blade to the rotor.

Because steam turbine rotors must operate at high rotational speeds in a thermally-hostile environment, rotor materials have been selected in part on the basis of creep-rupture strength. For this reason, the prior art has favored CrMoV and martensitic stainless steel alloys as rotor materials for the high pressure first stage and first stage reheat turbine rotors of steam turbines, while NiCrMoV and NiMoV low alloy steels have been favored for the low pressure rotors of steam turbines. Although rotors made from these alloys have exhibited a long service life, it is possible that wear, erosion, corrosion, shock, fatigue and/or overstress may occur, necessitating repair or replacement of a rotor. In addition, the dovetail region at the rotor rim may be subject to stress corrosion cracking, resulting from a combination of high stress and either a highly corrosive event or long exposure to mildly corrosive elements. The dovetail region is particularly susceptible to cracking as a result of the rim being subjected to higher stresses.

In the past, repairs of rim dovetail regions have been performed by welding, in which the damaged portion of the rim is removed and a steel weldment is built up in its place. In many cases, the repair requires the compromising of certain properties due to the limitations of the weld alloy or process, particularly if the service temperature of the rotor will exceed about 500° C. (about 950° F.). For example, weldments formed from alloys typically used in the prior art, such as CrMo alloys, exhibit rupture strengths of less than the CrMoV base alloy for the rotor. Though repairs using a CrMoV alloy would yield a weldment with improved strength at room temperature, strength is marginal at higher temperatures due to weldments formed from this alloy having a reduced rupture strength. Though steel repair materials can offer the benefit of higher rupture strengths, such improvements are at the expense of lower toughness (embrittlement). Furthermore, prior art repair methods using steel repair materials have generally required significant preheating, moisture control, and a post-weld stress relief operation.

Finally, full normalizing and temper heat treatments, which are generally required to develop properties similar to that of the original steel alloy of the rotor, would undesirably alter the precise dimensions of the rotors. Other alloys having desirable mechanical and environmental properties are often incompatible with the rotor base material. For example, martensitic chromium stainless steels disclosed in U.S. Pat. No. 4,710,103 to Gaber et al. and U.S. Pat. Nos. 4,897,519 and 4,958,431 to Clark et al., exhibit mean coefficients of thermal expansion that differ significantly from the base CrMoV material (e.g., about $11.6 \times 10^{-6}/°$ C. for 12Cr steels as compared to about $14.4 \times 10^{-6}/°$ C. for CrMoV steels at 540° C.). Consequently, repairs made with such materials are susceptible to thermal fatigue.

Accordingly, what is needed is a method for repairing a steam turbine rotor which entails a relatively uncomplicated process that employs a repair material whose mechanical, thermal and environmental properties are both compatible and at least comparable with, preferably superior to, traditional rotor materials.

SUMMARY OF THE INVENTION

It is an object of this invention to provide an improved method for repairing a steam turbine rotor, and particularly the dovetail region at the rim of such a rotor.

It is a further object of this invention that such a method entails the use of known and uncomplicated welding techniques that are compatible with the repair of steam turbine rotors.

It is another object of this invention that such a method employs a weld material that exhibits mechanical and environmental properties that are comparable to or exceed that of the rotor base material.

It is yet another object of this invention that such a material is compatible with the rotor base material so as to yield a repair that will have a long service life.

In accordance with a preferred embodiment of this invention, these and other objects and advantages are accomplished as follows.

According to the present invention, there is provided a method for repairing the rim portion of a steam turbine rotor formed of a steel alloy, generally martensitic stainless steels and CrMoV steels, and a weld material for repairing such rotors. The method does not require complicated or relatively expensive processing techniques, yet yields a repaired rotor having a reconstructed rim that exhibits mechanical and environmental properties that are comparable to that of the rotor base material. According to this invention, though the method is for the repair of steel alloy rotors, suitable repair materials for the method are certain nickel-base superalloys.

The method of this invention generally includes the steps of removing a damaged region of the rotor, such as the rim portion and its associated dovetail region, so as to form a surface at the perimeter of the rim portion. A repair weldment of a nickel-base superalloy is then formed on the surface of the perimeter, after which the weldment is machined to reconstruct the rim portion and its dovetail region exclusively with the weldment. As used herein, the term "weldment" denotes the nickel-base superalloy weld material and any further material, such as a forged ring, that might be attached to the rim portion with the nickel-base superalloy weld material. A final step of the method is to secure an appropriately configured blade to the rim portion with the dovetail region.

At the rims of steam turbine rotors, temperatures, stresses and steam conditions vary greatly from one end of the turbine to the other, such that the requirements for rupture strength, toughness, corrosion resistance and coefficient of thermal expansion will vary. According to this invention, suitable nickel-base superalloys are characterized by a coefficient of thermal expansion within about 15 percent of the rotor steel alloy over a temperature range of about 200° to 540° C., and have a room temperature ultimate tensile strength in excess of the specific design requirements for the rotor, generally at least about 690 MPa (about 100 ksi). Particularly preferred materials for the dovetail weld repair of martensitic, CrMoV, NiCrMoV and NiMoV steel alloys are Inconel 625 and 725 alloys, though it is foreseeable that Inconel 600 and 718 alloys may be preferred or required under some conditions.

Though the repair method of this invention results in the presence of two dissimilar materials in a region of the rotor having a complex geometry and where thermal, environmental and loading conditions are severe over a broad range of temperatures, generally room temperature to in excess of 500° C., the method nevertheless has been found to yield repairs that exhibit compatibility with the steel alloy rotor in terms of weldability, metallurgy and thermal properties. According to the invention, compatibility can be promoted by the creation in the weld repair region of an interface region, in which a dispersion of Type II carbides is present as a diffuse array of small carbides formed at the fusion line between the dissimilar weld and rotor materials.

According to this invention, the method is capable of being performed using known and relatively uncomplicated welding techniques that are compatible with the repair of steam turbine rotors, and without the requirement for extensive heat treatments such as a welding preheat and post-weld stress relief, which are costly and may be incompatible with steam turbine rotors. Furthermore, the method yields a repair weld that exhibits mechanical and environmental properties that are comparable or exceed that of the rotor base material, while being sufficiently compatible with the rotor base material so as to yield a repair that will have a long service life.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
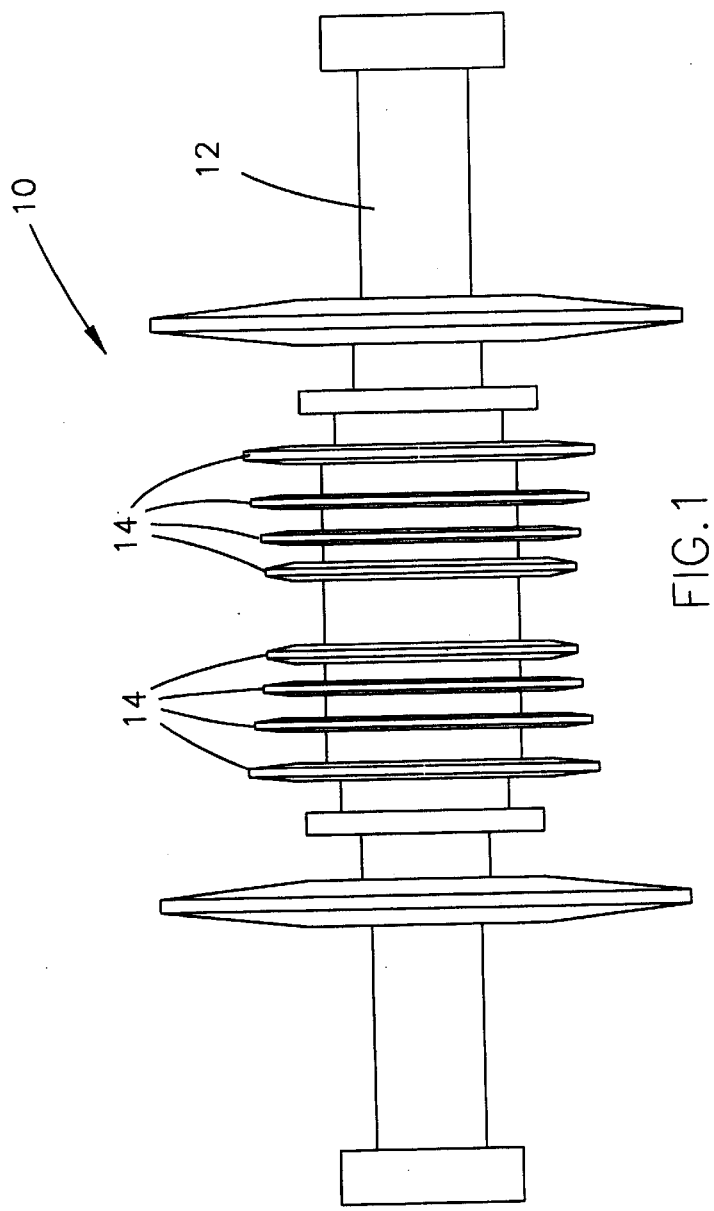
FIG. 1 is a side view of a steam turbine rotor assembly of a type known in the art, with blades not shown at the rim of the rotors for the purpose of clarity.

FIG. 1 represents an example of a steam turbine rotor assembly 10 of a type to be repaired in accordance with the present invention. The assembly 10 generally includes a rotor shaft 12 on which a number of wheels 14 are either mounted to or formed integrally with the shaft 12. Each wheel 14 is adapted to secure a number of buckets or blades (not shown). Within a steam turbine, the series of wheels 14 form stages between stationary blades or nozzles. Steam passing through the assembly 10 performs work on the wheels 14, which is transmitted through the shaft 12 to a suitable load, such as an electrical generator. According to this invention, preferred materials for the shaft 12 and wheels 14 are steel alloys such as martensitic stainless steels and NiCrMoV, NiMoV and CrMoV alloys. A particularly suitable CrMoV alloy has a nominal composition, in weight percent, of about 1.20 chromium, about 1.25 molybdenum, about 0.25 vanadium and lesser amounts of other elements. Preferred steel alloys have a room temperature tensile strength of at least about 690 MPa (about 100 ksi), with the above-noted CrMoV alloy having a room temperature tensile strength of about 725 MPa (about 105 ksi).

Figure 2:
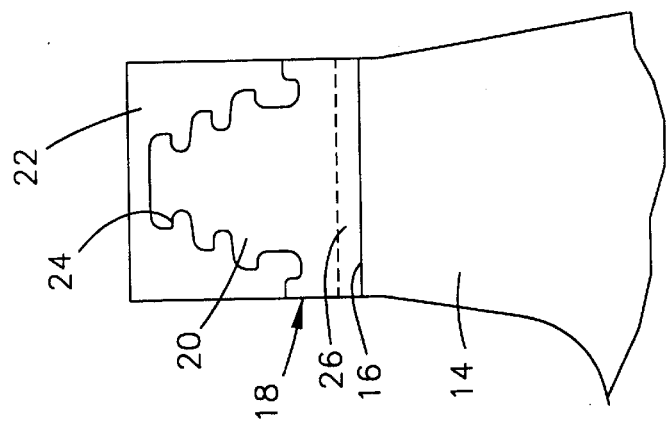
FIG. 2 represents a detailed cross-sectional view of a steam turbine rotor rim that has been repaired in accordance with this invention.

FIG. 2 is a fractional cross-sectional view of the rim of a wheel 14 that has been repaired with a weldment 18 in accordance with this invention. As shown, the weldment 18 has been machined to reconstruct a dovetail 20, to which a turbine blade is secured by mating the dovetail 20 with a dovetail feature 24 formed at the blade root 22 of the blade. According to this invention, suitable materials for the weldment 18 are nickel-base superalloys that exhibit mechanical and thermal properties that are comparable to the material of the wheel 14, e.g., an ultimate tensile strength (UTS) of at least about 690 MPa (about 100 ksi) and a coefficient of thermal expansion (CTE) of within about 15 percent of that of the material for the wheel 14. For the CrMoV alloy described above, a preferred range for the coefficient of thermal expansion of the weldment 18 is about 13.7 to 14.2×10$^{-6}$/° C. at about 430° C. (about 800° F.). While various nickel-base superalloys meet these requirements, particularly preferred alloys are Inconel 625 and 725, which are characterized by the following approximate nominal compositions, in weight percent, and properties.

|  | 625 | 725 |
|---|---|---|
| Nickel | 58% min. | 56% |
| Chromium | 21.5% | 21% |
| Molybdenum | 9.0% | 8.1% |
| Niobium | 3.6% | 3.6% |
| Iron | 2.5% | 9.5% |
| Aluminum | 0.2% | 0.2% |
| Titanium | 0.2% | 1.5% |
| Manganese | 0.2% | 0.08% |
| Silicon | 0.2% | 0.05% |
| Carbon | 0.05% | 0.006% |
| UTS (MPa) | 760 | 1248 |
| CTE (×10$^{-6}$/°C.) (at 430° C.) | 13.7 | 13.7 |

Other potentially suitable nickel-base superalloys include Inconel 600 and 718, the compositions of which are known in the art.

The preferred repair method of this invention entails completely removing the damaged dovetail (not shown) from the wheel 14 of FIG. 2 to yield a surface 16, preferably a cylindrical-shaped surface that circumscribes the rim as shown, on which the weldment 18 is initially formed using a suitable welding technique, such as submerged arc welding (SAW) and gas tungsten arc welding (GTAW), though it is foreseeable that other techniques could be employed, such as gas metal arc and shielded metal arc welding, each of which is known in the art. Preferably welding proceeds in a manner such that a region 26 of the weldment 18 immediately adjacent the surface 16 is a dilute composition with a dispersion of Type II carbides, though it is foreseeable that Type II carbides may not be required for all applications within the scope of this invention.

Following the welding operation, a post-weld heat treatment may be performed to temper any heat affected zone (HAZ) that may have developed in the wheel 14 beneath the surface 16 adjacent the weldment 18. Finally, as shown in FIG. 2, the dovetail 20 is reconstructed from the weldment 18 by any suitable machining technique. Alternatively, the weldment 18, as the term is used herein, may include further material, such as a forged ring that is attached to the rim of the wheel 14 with the nickel-base superalloy weld material. Following machining, the turbine blade 22 is secured to the wheel 14 by mating the dovetail 20 with the dovetail feature 24 of the blade 22. As shown, the dovetail 20 is an irregular male feature whose shape is complementary to the dovetail feature 24 of the blade 22. While a particular geometry for the dovetails 20 and 24 are shown, those skilled in the art will appreciate that various geometries are possible.

In view of the above, it can be appreciated that the repair method of this invention subsists in the metallurgical bonding of two dissimilar materials at the rim of the wheel 14, where the thermal, environmental and loading conditions are severe over a broad range of temperatures, from room temperature to in excess of 500° C. Generally, any adverse affect of the dissimilar materials would be presumed to be exasperated by the complex geometry of the dovetails 20 and 24. Yet the method of this invention has been found to yield a weldment 18 that is compatible with the wheel 14 in terms of weldability, metallurgy and thermal properties, a result that is promoted by the presence of the region 26 contiguous with the steel alloy of the wheel 14. Furthermore, the resulting repair weldment 18 and dovetail 20 exhibit mechanical and environmental properties that are comparable to or exceed that of the steel alloy material of the wheel 14, while being sufficiently compatible with preferred steel alloys to yield a dovetail 20 capable of exhibiting a long service life. Finally, a significant advantage of this invention is that the above benefits of this invention are attained with known and relatively uncomplicated welding techniques that are compatible with the repair of steam turbine rotors, and without the requirement for heat treatments such as a welding preheat and post-weld stress relief.

While our invention has been described in terms of a preferred embodiment, it is apparent that other forms could be adopted by one skilled in the art. Therefore, the scope of our invention is to be limited only by the following claims.

The embodiments of the invention in which an exclusive property or privilege is claimed are defined as follows:

1. A turbine rotor comprising a radially-inward portion of a steel alloy and a radially-outward rim portion circumscribing the radially-inward portion, the rim portion comprising means for securing a turbine blade thereto, the rim portion being formed by a weldment that includes a nickel-base superalloy region joining the rim portion to the inward portion of the turbine rotor, the nickel-base superalloy having a room temperature ultimate tensile strength of at least about 690 MPa.

2. A turbine rotor as recited in claim 1 wherein the nickel-base superalloy has a coefficient of thermal expansion within about 15 percent of the steel alloy over a temperature range of 200° to 540° C.

3. A turbine rotor as recited in claim 1 wherein the steel alloy is an alloy chosen from the group consisting of NiCrMoV, NiMoV and CrMoV alloys.

4. A turbine rotor as recited in claim 1 wherein the nickel-base superalloy is Inconel 625 or Inconel 725.

5. A turbine rotor as recited in claim 1 wherein the nickel-base superalloy includes an interface region contiguous with the steel alloy, the interface region being characterized by a dispersion of Type II carbides.

6. A turbine rotor as recited in claim 1 further comprising a blade secured by the securing means to the rim portion.

7. A turbine rotor as recited in claim 1 wherein the securing means is a dovetail region projecting radially outward from the rim portion.

8. A turbine rotor as recited in claim 1 wherein the rim portion and the securing means are exclusively formed by the nickel-base superalloy.

9. A steam turbine rotor assembly comprising
  a turbine rotor having a base portion and a peripheral rim portion, the base portion being formed of a steel alloy chosen from the group consisting of NiCrMoV, NiMoV and CrMoV alloys, the rim portion being formed by a weldment that includes a dovetail region, the weldment comprising a nickel-base superalloy joining the rim portion to the base portion of the turbine rotor, the nickel-base superalloy being chosen from the group consisting of Inconel 625 and Inconel 725; and
  a blade secured to the rim portion, the blade having a root with a complementary shape to the dovetail region of the rim portion, the complementary shape of the root being engaged with the dovetail region so as to secure the blade to the turbine rotor.

10. A steam turbine rotor assembly as recited in claim 9 wherein the nickel-base superalloy comprises an interface region contiguous with the steel alloy, the interface region being characterized by a dispersion of Type II carbides.

11. A steam turbine rotor assembly as recited in claim 9 wherein the rim portion and the dovetail region are exclusively formed by the nickel-base superalloy.

* * * * *